United States Patent
Depelteau et al.

(10) Patent No.: US 7,716,204 B1
(45) Date of Patent: May 11, 2010

(54) HANDLE ALLOCATION MANAGERS AND METHODS FOR INTEGATED CIRCUIT SEARCH ENGINE DEVICES

(75) Inventors: Gary Depelteau, Ottawa (CA); Pascal de Wit, Hammond (CA)

(73) Assignee: NetLogic Microsystems, Inc., Mountain View, CA (US)

( * ) Notice: Subject to any disclaimer, the term of this patent is extended or adjusted under 35 U.S.C. 154(b) by 377 days.

(21) Appl. No.: 11/962,716

(22) Filed: Dec. 21, 2007

(51) Int. Cl.
- G06F 7/00 (2006.01)
- G06F 13/00 (2006.01)
- G06F 13/28 (2006.01)
- G06F 15/16 (2006.01)
- G06F 17/30 (2006.01)
- H04L 12/28 (2006.01)
- H04L 12/56 (2006.01)

(52) U.S. Cl. .................. 707/706; 370/389; 707/737; 709/245; 711/117

(58) Field of Classification Search .................. 370/389; 707/3, 706, 737; 709/245; 711/117
See application file for complete search history.

(56) References Cited

U.S. PATENT DOCUMENTS

| 4,606,002 A | 8/1986 | Waisman et al. |
| 5,430,869 A | 7/1995 | Ishak et al. |
| 5,446,887 A | 8/1995 | Berkowitz |
| 5,475,837 A | 12/1995 | Ishak et al. |
| 5,560,007 A | 9/1996 | Thai |
| 5,644,763 A | 7/1997 | Roy |
| 5,666,494 A | 9/1997 | Mote, Jr. |
| 5,758,356 A | 5/1998 | Hara et al. |
| 5,787,430 A | 7/1998 | Doeringer et al. |
| 5,813,000 A | 9/1998 | Furlani |
| 5,822,749 A | 10/1998 | Agarwal |
| 5,897,655 A | 4/1999 | Mallick |
| 5,918,245 A | 6/1999 | Yung |
| 5,924,115 A | 7/1999 | Von Herzen et al. |
| 6,098,150 A | 8/2000 | Brethour et al. |
| 6,115,792 A | 9/2000 | Tran |
| 6,219,662 B1 | 4/2001 | Fuh et al. |
| 6,226,710 B1 * | 5/2001 | Melchior ..................... 711/108 |

(Continued)

FOREIGN PATENT DOCUMENTS

WO  WO2004088548 A1  10/2004

OTHER PUBLICATIONS

Aggarwal et al. "A Model for Hierarchical Memory" *Proceedings of the Nineteenth Annual ACM Conference on Theory of Computing STOC* pp. 305-314 (1987).

(Continued)

*Primary Examiner*—James Trujillo
*Assistant Examiner*—Jorge A Casanova
(74) *Attorney, Agent, or Firm*—Mahamedi Paradice Kreisman LLP; William L. Paradice, III

(57) ABSTRACT

A handle allocation manager is provided for an integrated circuit search engine device that includes multiple stages of a multilevel tree of search keys and a handle memory. The handle allocation manager includes a handle availability memory that stores handle availability indicators to provide an indication of whether a handle is available for association with a key. A handle availability summary memory stores indicators for groups of handles and a block availability summary memory stores indicators for multiple groups of handle availability summary memories. The handle allocation manager can use these memories to search for a next available handle. Related methods are also provided.

19 Claims, 7 Drawing Sheets

U.S. PATENT DOCUMENTS

| | | |
|---|---|---|
| 6,389,507 B1 | 5/2002 | Sherman |
| 6,401,117 B1 | 6/2002 | Narad et al. |
| 6,404,752 B1 | 6/2002 | Allen, Jr. et al. |
| 6,421,730 B1 | 7/2002 | Harad et al. |
| 6,430,527 B1 | 8/2002 | Waters et al. |
| 6,441,053 B1 | 8/2002 | Klein et al. |
| 6,460,112 B1 | 10/2002 | Srinivasan et al. |
| 6,460,120 B1 | 10/2002 | Bass et al. |
| 6,490,592 B1 | 12/2002 | St. Denis et al. |
| 6,522,632 B1 | 2/2003 | Waters et al. |
| 6,535,491 B2 | 3/2003 | Gai et al. |
| 6,539,369 B2 | 3/2003 | Brown |
| 6,553,370 B1 | 4/2003 | Andreev et al. |
| 6,564,211 B1 | 5/2003 | Andreev et al. |
| 6,629,099 B2 * | 9/2003 | Cheng .......... 707/10 |
| 6,633,865 B1 | 10/2003 | Liao |
| 6,636,849 B1 | 10/2003 | Tang et al. |
| 6,636,956 B1 | 10/2003 | Venkatachary et al. |
| 6,662,287 B1 | 12/2003 | Andreev et al. |
| 6,691,124 B2 | 2/2004 | Gupta et al. |
| 6,694,323 B2 | 2/2004 | Bumbulis |
| 6,697,276 B1 * | 2/2004 | Pereira et al. ........... 365/49.17 |
| 6,757,779 B1 | 6/2004 | Nataraj et al. |
| 6,768,739 B1 | 7/2004 | Kobayashi et al. |
| 6,778,530 B1 | 8/2004 | Greene |
| 6,831,850 B2 | 12/2004 | Pereira et al. |
| 6,839,800 B2 | 1/2005 | Stark |
| 6,862,281 B1 * | 3/2005 | Chandrasekaran ......... 370/392 |
| 6,934,795 B2 | 8/2005 | Nataraj et al. |
| 6,941,314 B2 | 9/2005 | Andreev et al. |
| 6,944,709 B2 | 9/2005 | Nataraj et al. |
| 7,016,904 B1 | 3/2006 | Grove et al. |
| 7,017,021 B2 | 3/2006 | Gupta et al. |
| 7,023,807 B2 | 4/2006 | Michels et al. |
| 7,024,515 B1 * | 4/2006 | Ruan et al. ........... 711/108 |
| 7,035,844 B2 | 4/2006 | Andreev et al. |
| 7,047,317 B1 | 5/2006 | Huie et al. |
| 7,076,602 B2 | 7/2006 | Stark et al. |
| 7,107,263 B2 | 9/2006 | Yianilos et al. |
| 7,231,373 B2 | 6/2007 | Kidd et al. |
| 7,231,383 B2 | 6/2007 | Andreev et al. |
| 7,257,530 B2 | 8/2007 | Yin |
| 7,281,085 B1 * | 10/2007 | Garg et al. ........... 711/108 |
| 7,289,979 B2 | 10/2007 | Wilson |
| 7,292,162 B2 | 11/2007 | Somasundaram |
| 7,565,481 B1 * | 7/2009 | Om ........... 711/108 |
| 7,602,787 B2 * | 10/2009 | Cheriton ........... 370/392 |
| 2002/0089937 A1 | 7/2002 | Venkatachary et al. |
| 2002/0146009 A1 | 10/2002 | Gupta et al. |
| 2003/0093613 A1 | 5/2003 | Sherman |
| 2004/0030686 A1 | 2/2004 | Cardno et al. |
| 2004/0083336 A1 | 4/2004 | Stark et al. |
| 2004/0193619 A1 | 9/2004 | Venkatachary et al. |
| 2004/0249803 A1 | 12/2004 | Vankatachary et al. |
| 2005/0262295 A1 * | 11/2005 | Nataraj et al. ........... 711/108 |
| 2007/0113003 A1 * | 5/2007 | Joshi ........... 711/108 |

OTHER PUBLICATIONS

"B-Trees: Balanced Tree Data Structures" pp. 1-8 (believed prior to Nov. 27, 2006) <http://www.bluerwhite.org/btree/>.

Chang et al. "Dynamic Routing Tables using Augmented Balanced Search Tree" *National Cheng Kung University and I-Shou University* (35 pages)(believed prior to Jul. 23, 2004).

Choudhury et al. "A New Buffer Management Scheme for Hierarchical Shared Memory Switches" *IEEE/ACM Transactions on Networking (TON)* 5(5):728-738 (1997).

Djordjevic et al. "A Hierarchical Memory System Environment" *Proceedings of the 1988 Workshop on Computer Architecture Education WCAE* (6 pages)(1998).

Lu et al. "A B-Tree Dynamic Router-Table Design" pp. 1-27 (believed prior to Nov. 27, 2006).

O'Connor et al. "The iFlow Address Processor" 2001 *IEEE Micro* pp. 16-23 (2001).

Suri et al. "Multiway Range Trees: Scalable IP Lookup with Fast Updates" (5 pages)(believed prior to Nov. 27, 2006) http://www.cs.edu/—Varghese/PAPERS/globecome2001.pdf.

* cited by examiner

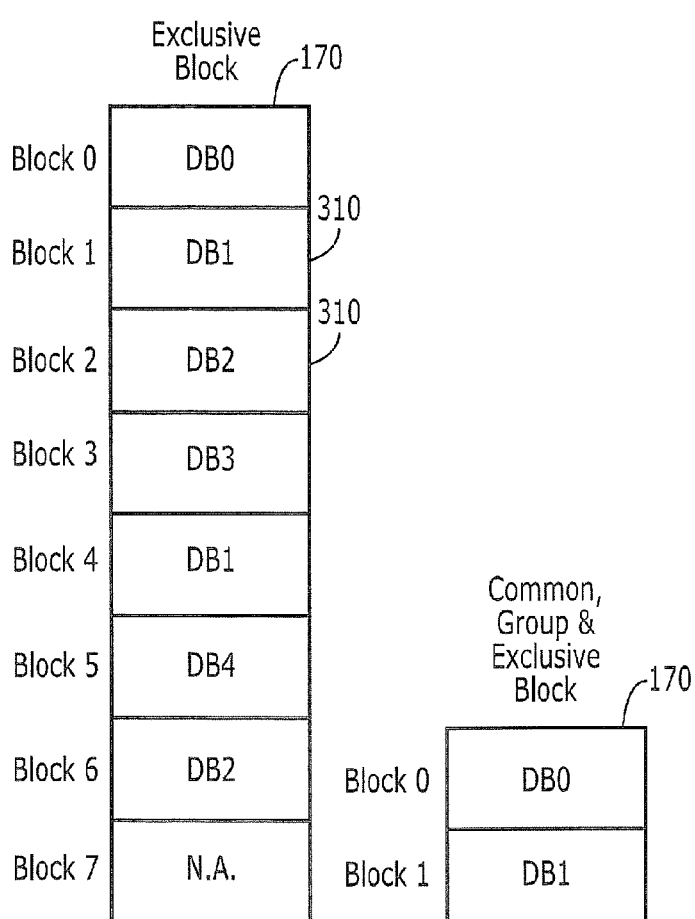
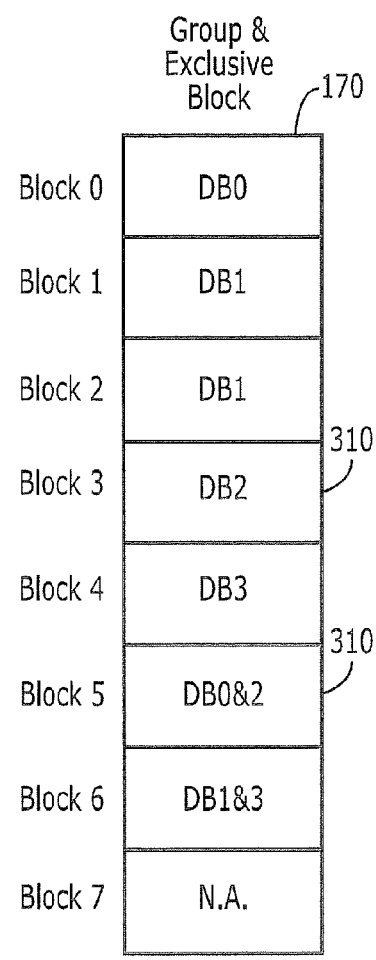
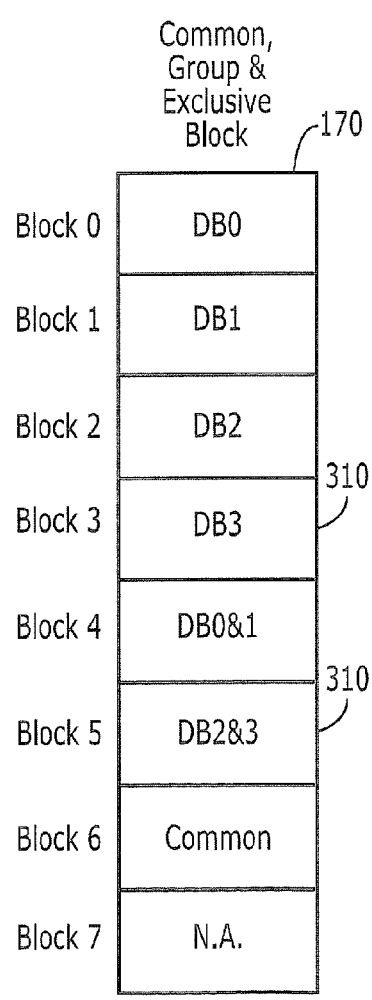
FIG. 3A
FIG. 3B
FIG. 3C

HANDLE ALLOCATION MANAGERS AND METHODS FOR INTEGATED CIRCUIT SEARCH ENGINE DEVICES

FIELD OF THE INVENTION

This invention relates to integrated circuit devices and, more particularly, to integrated circuit search engine devices and methods of operating same.

BACKGROUND OF THE INVENTION

Integrated circuit search engine devices are widely used to perform linear searches of input search keys to find best match keys. In order to facilitate searching, an integrated search engine device may include a plurality of serially connected stages, a respective one of which is configured to store therein a respective level of search keys in a multilevel tree of search keys, such as a B-tree of search keys. The serially connected stages include a first or root level stage that is responsive to an input search key, and a last or leaf level stage that is configured to identify the best match key for the input search key. A handle memory also is provided, including a plurality of handle memory locations, a respective one of which is configured to store a search result handle, also generally referred to as a handle. The handle memory is responsive to the last level stage to retrieve a handle that corresponds to the best match key.

Integrated circuit search engine devices may be used in many applications. One application is that of a route accelerator that supports search acceleration for packet forwarding in a router.

SUMMARY OF THE INVENTION

Integrated circuit search engine devices according to some embodiments include a plurality of serially connected stages, a handle memory and a handle allocation manager. A respective one of the plurality of serially connected stages is configured to store therein a respective level of search keys in a multi-level tree of search keys. The plurality of serially connected stages include a first level stage that is responsive to an input search key and a last level stage that is configured to identify a best match key for the input search key. The handle memory includes a plurality of handle memory locations, a respective one of which is configured to store a search result handle. The handle memory is responsive to the last level stage to retrieve a search result handle that corresponds to the best match key. The handle allocation manager includes a handle availability memory that is configured to store therein a plurality of handle availability indicators. A respective handle availability indicator provides an indication of whether a respective handle is available for storing, i.e., for association with a key.

The handle allocation manager may be further configured to search the handle availability memory to identify a next available handle. The handle allocation manager may also be configured to mark a given handle as not available in response to associating (i.e., pairing) the given handle with a key. The handle allocation manager may be configured to search the handle availability memory to identify a next available handle by indexing into the handle availability memory using the search result handle that is retrieved.

In other embodiments, the handle allocation manager also includes a handle availability summary memory that is configured to store therein a plurality of handle memory group availability indicators. A respective handle memory group availability indicator provides an indication of whether a respective group of handle memory locations contains at least one handle availability indicator. In these embodiments, the handle allocation manager may be further configured to search the handle availability memory and the handle availability summary memory to identify a next available handle. The handle allocation manager may be configured to search the handle availability memory and the handle availability summary memory to identify a next available handle by searching the handle availability summary memory in a given sequence, such as least significant value to most significant value, to identify a first handle memory group availability indicator and a corresponding group of handles, and then to search the handle availability memory for the corresponding group of handles in a given sequence, such as least significant value to most significant value, to identify a first handle availability indicator and a corresponding next available handle. The handle allocation manager may be further configured to mark the next available handle as not available in response to associating the next available handle as unavailable, and to mark the handle memory summary location that includes the next available handle as not available if no more available handles are present in the corresponding handle group.

In still other embodiments, the handle allocation manager further includes a block availability summary memory that is configured to store therein a plurality of handle memory block availability indicators. A respective handle memory block availability indicator provides an indication of whether a respective plurality of groups of handle availability summary memory locations contain at least one handle memory group availability indicator. In these embodiments, the handle allocation manager may be configured to search the handle available memory, the handle availability summary memory and the block availability summary memory, to identify a next available handle. More particularly, in some embodiments, the handle allocation manager may be configured to identify a next available handle by searching the block availability summary memory in a given sequence, such as least significant value to most significant value, to identify a first handle block availability indicator and a corresponding handle block, then searching the handle availability summary memory corresponding to the handle block in a given sequence, to identify a first handle memory group availability indicator and a corresponding group of handles, and then searching the handle availability memory for the corresponding group of handles in a given sequence, to identify a first handle availability indicator and a corresponding next available handle. In other embodiments, the handle allocation manager may be further configured to mark a next available handle as not available in response to associating the next available handle with a key, to mark the handle memory summary location that includes the next available handle as not available if no more available handles are present in the corresponding handle group, and to mark the block availability summary memory location that includes the handle memory summary location as not available if no more available handles are present in the corresponding block.

In any of the embodiments described herein, the serially connected stages may be configured to store therein a respective level of search keys in a plurality of multilevel trees of search keys for a plurality of databases. The handle memory may be configured to store search result handles for the plurality of databases. Moreover, the handle allocation memory may be configured to store therein a plurality of handle availability indicators for a plurality of handles for the plurality of databases. In some embodiments, the handle availability memory may include at least one group block that is configured to store therein handle availability locations for at least two of the plurality of databases. In yet other embodiments, the handle availability memory may include at least one common block that is configured to store therein handle availability indicators for all of the plurality of databases.

It will be understood that embodiments have been described above in connection with integrated search engine devices that include a plurality of serially connected stages, a handle memory and a handle manager. However, corresponding handle management methods may also be provided according to other embodiments. These handle management methods may be used to operate an integrated circuit search engine device that includes a plurality of serially connected stages and a handle memory. These handle management methods may include storing in a handle availability memory a plurality of handle availability locators according to any of the embodiments described herein.

BRIEF DESCRIPTION OF THE DRAWINGS

FIGS. 3A-3C illustrate handle availability memory block mapping according to various embodiments of the present invention.

DETAILED DESCRIPTION

Figure 1:
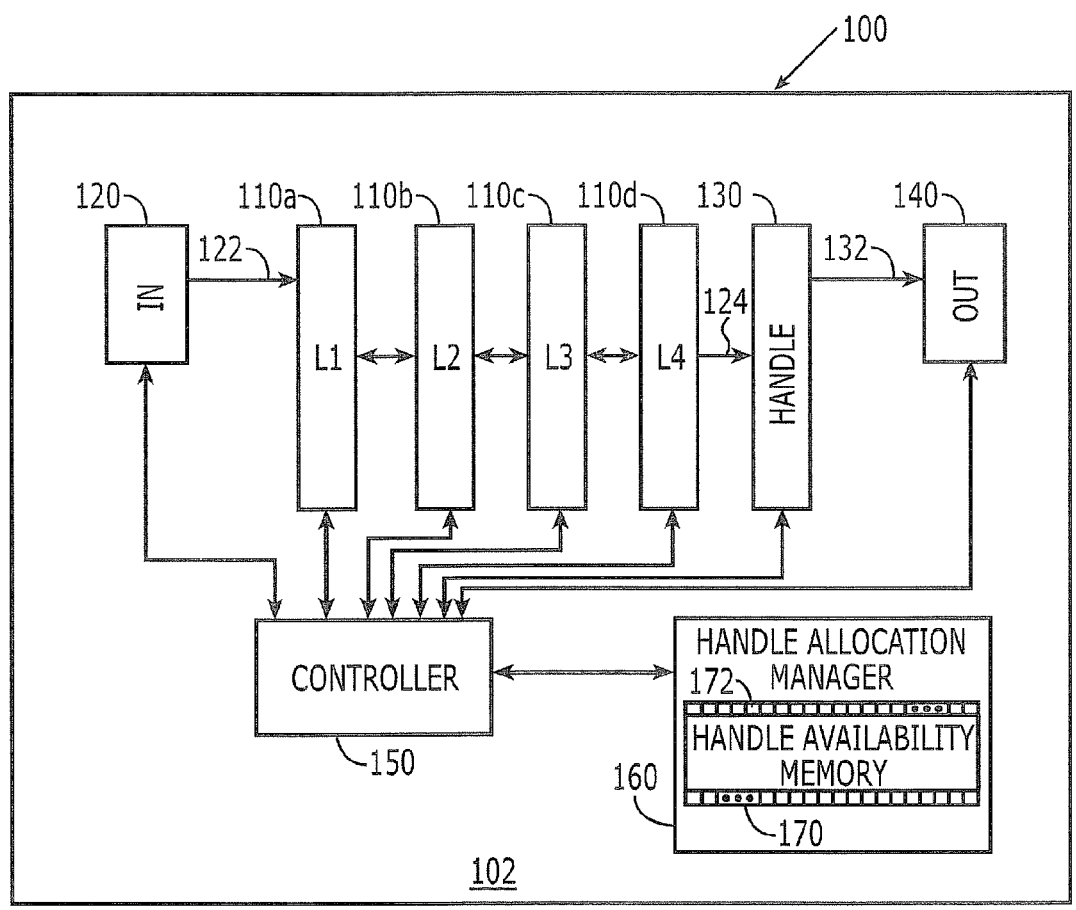
FIG. 1 is a block diagram of an integrated circuit search engine device according to various embodiments of the present invention.

Exemplary embodiments now will be described more fully hereinafter with reference to the accompanying figures, in which embodiments are shown. There may be alternate embodiments in many alternate forms, and the embodiments described herein should not be construed as limiting.

Accordingly, while exemplary embodiments are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the teens "comprises", "comprising," "includes" and/or "including", and variants thereof, when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, and variants thereof, it can be directly responsive to the other element, or intervening elements may be present. In contrast, when an element is referred to as being "directly responsive" to another element, and variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods and/or apparatus (systems and/or devices). It is understood that a block of the block diagrams and/or flowchart illustrations, and combinations of blocks in the block diagrams and/or flowchart illustrations, can be embodied in hardware and/or in software (including firmware, resident software, micro-code, etc.), to provide means (functionality) and/or structure for implementing the functions/acts specified in the block diagrams and/or flowchart block or blocks; and/or to provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of an integrated circuit search engine device 100 according to some embodiments of the present invention. In these devices 100, all of the blocks contained therein are embodied in one or more semiconductor integrated circuit substrates, and in some embodiments, in a single semiconductor integrated circuit substrate 102, also referred to herein as a "chip". Other functionality may also be provided on the integrated circuit substrate 102.

Still referring to FIG. 1, a plurality of serially connected stages 110a-110d are provided. The stages 110a-110d may also be referred to as a lookup core. Although four stages are illustrated in FIG. 1, fewer or larger numbers of stages may also be provided according to other embodiments of the present invention. A respective one of the stages 110a-110d is configured to store therein a respective level L1-L4 of search keys in a multilevel tree of search keys. The search keys may be stored in a B-tree, a B*-tree and/or any other tree structure. A first level stage L1 (110a), also referred to a "root stage", is responsive to an input search key 122 that may be provided by an input interface 120 and a last level stage L4 (110d), also referred to as a "leaf stage", is configured to identify a best match key 124 for the input search key 122. Each stage 110a-110d may include a memory, buffers and/or comparators, and may be arranged in a pipeline arrangement to increase the maximum search rate. This configuration of serially connected stages that are configured to store therein levels of search keys in a multilevel tree of search keys may also be referred to as an "algorithmic search engine", that may be contrasted with a single level Content Addressable Memory (CAM).

The handle memory 130 includes a plurality of handle memory locations, a respective one of which is configured to store at least one search result handle. The handle memory 130 is responsive to the last level stage 110d, to retrieve a search result handle 132 that corresponds to the best match key 124. This handle 132 is provided to an output interface 140. A controller 150 may be used to control the above-mentioned elements. A single controller or multiple distributed controllers may be used.

A handle allocation manager 160 also is provided according to various embodiments of the present invention. The handle allocation manager 160 includes a handle availability memory 170. The handle availability memory 170 is configured to store therein a plurality of handle availability indicators 172, a respective one of which provides an indication of whether a respective handle is available for storing, i.e., for association with a key. The handle allocation manager 160 may interface with the controller 150, to provide desired handle availability memory operations, such as searching, reading, checking and/or flushing, as will be described in detail below.

Figure 2:
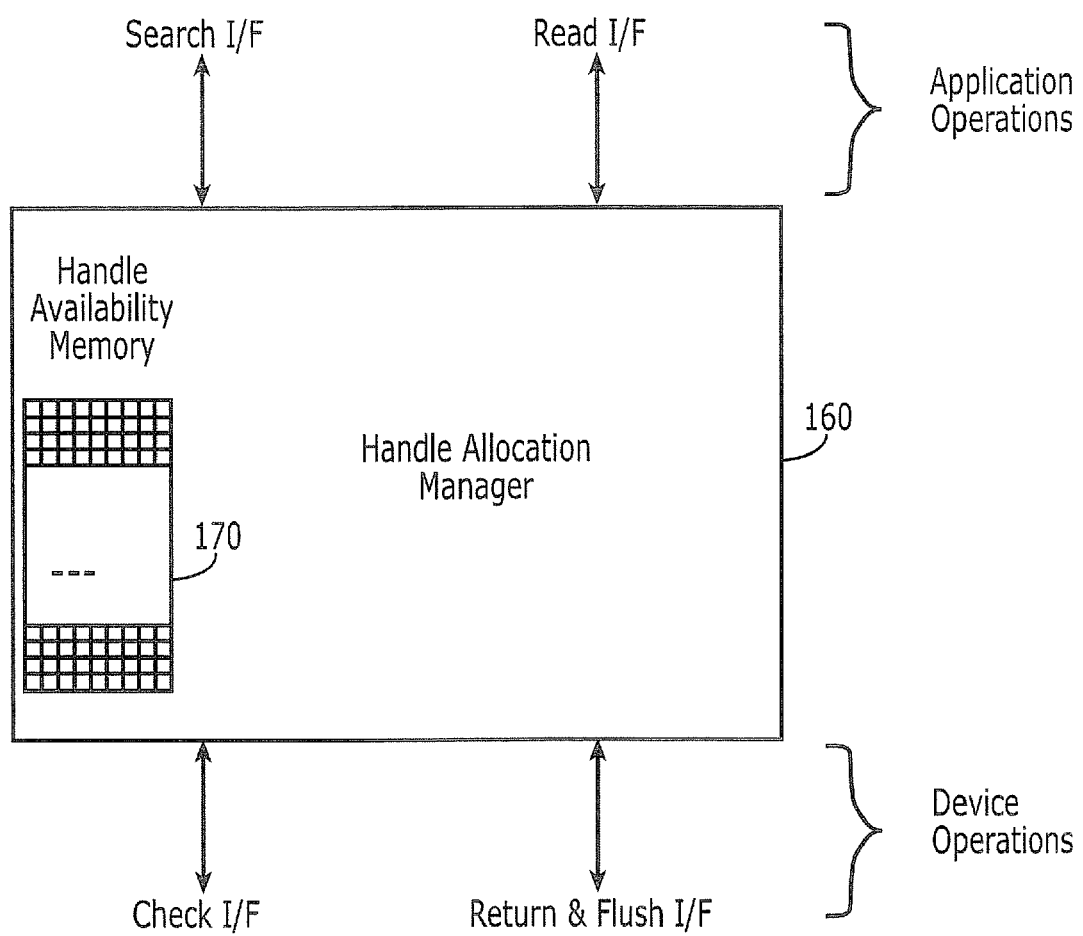
FIG. 2 is a block diagram of a handle allocation manager according to various embodiments of the present invention.

FIG. 2 is a block diagram illustrating interfaces (I/F) that may be provided between a handle allocation manager, such as allocation manager 160 of FIG. 1, and a controller, such as controller 150 of FIG. 1. These interfaces may be used to manage the allocation of handles. The search function provides for searching for a next available free handle. The read interface provides for a raw data structure reading of the handle availability memory 160 for external processing. The search and read interfaces may be combined into a single interface since they relate to non-modifying operations that are performed by an application. The check interface is used to check the validity and availability of a handle about to be inserted into the search structure. The return and flush functions are shown together in a single interface, since they both relate to operations that are performed after a key or keys are removed from the stages/search structures. Separate interfaces may also be provided for search and flush operations. The act of marking a handle as unavailable can be performed by the search interface, in which case the check interface may only perform validity tests. Alternately, a handle can be marked as unavailable by the check interface, in which case the search interface may only perform a next free handle search.

FIGS. 3A-3C illustrate mapping of a handle availability memory 170 into blocks according to various embodiments of the invention. These blocks may be assigned as will now be described. In some embodiments, the blocks may be assigned to a single multilevel tree of search keys, also referred to herein as a "database". In other embodiments, however, the integrated circuit search engine device may be used to search multiple trees of search keys, i.e., a plurality of databases. In these embodiments, blocks may be assigned in an exclusive manner (FIG. 3A), in a group and exclusive manner (FIG. 3B), or in a common, group and exclusive manner (FIG. 3C).

More specifically, in FIG. 3A, a given block 310 is exclusive to a given database. Thus, each database is assigned one or more handle blocks on an exclusive basis. A database can have 0, 1 or more handle blocks (in no particular order), but a given handle block is not assigned to more than one database in embodiments of FIG. 3A.

In embodiments of FIG. 3B, each database has some exclusive handle blocks, as well as some that are shared on a group basis. For example, in embodiments of FIG. 3B, Blocks 5 and 6 are shared by even/odd databases. In some embodiments, the shared group of handle blocks will only be consumed once the exclusive handle blocks are exhausted.

FIG. 3C illustrates adding one or more handle blocks that are common, i.e., they may be consumed by any database. A common block is shown at the end of the structure, and may not be consumed before all other handles (exclusive and shared) are exhausted. However, other placements may be used. Finally, not allocated (N.A.) handle blocks can be located anywhere, and need not be located at the end of the range, as shown. N.A. handle blocks may be used for future expansion.

Figure 4:
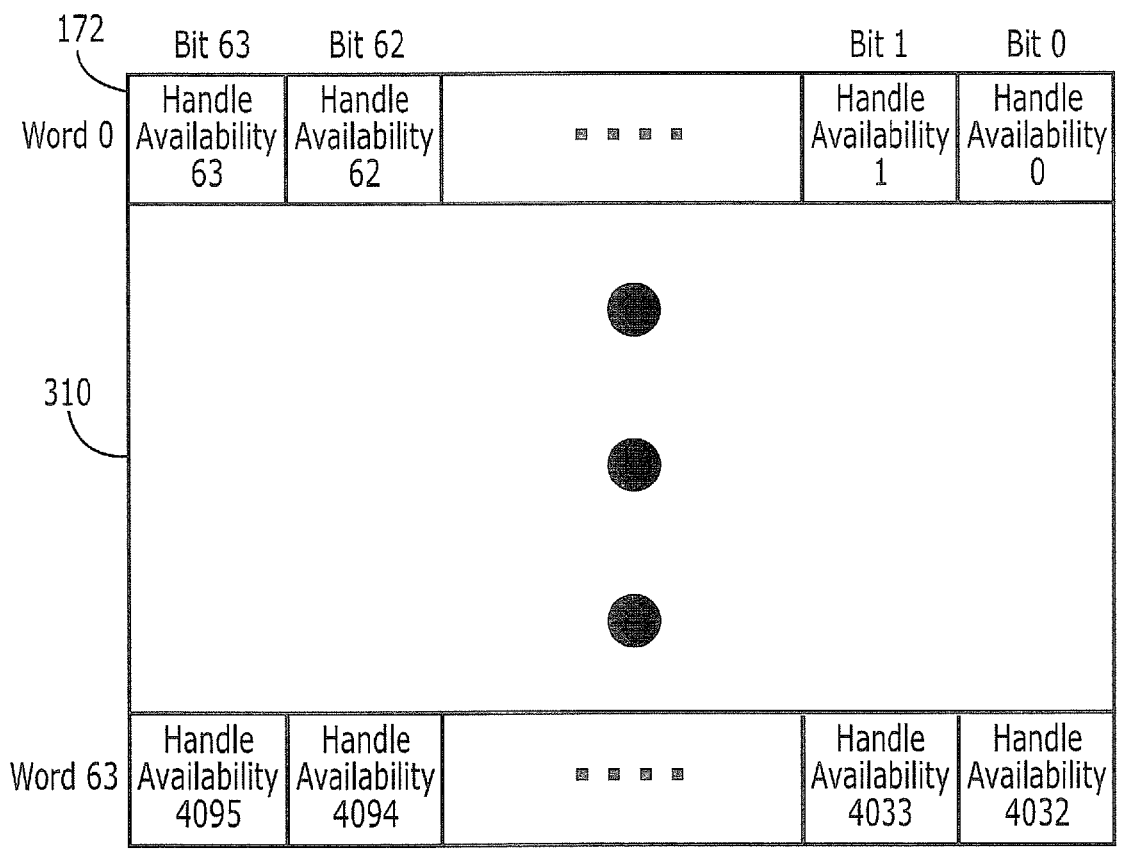
FIG. 4 illustrates a structure of a handle availability memory according to various embodiments of the present invention.

FIG. 4 illustrates a mapping of a given handle availability memory block, such as a given handle availability memory block 310 of FIG. 3. As shown in FIG. 4, each block includes B handles and there are N blocks (numbered from 0 to N−1) for a total handle capacity of n=N*B. The start/stop ranges for handle values are from Bi to (B(i+1)−1) for each block i.

As illustrated in FIG. 4, a handle availability memory block 310 includes a plurality of words, for example 64 words. Each word includes a plurality of handle availability indicators, which may be in the form of a 1 bit indicator, wherein a value of ONE indicates that the corresponding handle is available for use as a search result handle (i.e., for association with a key) and a value of ZERO indicates that the corresponding handle is not available for association with a key, or vice versa. Thus, in FIG. 4, a given word can store handle availability indicators for 64 handles. Stated differently, by indexing to a given handle availability bit in the block using a given search result handle, an indication may be provided as to whether or not a corresponding handle is available for use as a search result handle (i.e., for association with a key). Accordingly, the handle availability memory 170 is configured to store therein a plurality of handle availability indicators 172, a respective one of which provides an indication of whether a respective handle is available for association with a key.

It will be understood by those having skill in the art that in FIG. 4, a 4K bit block is shown as an example, but other sizes and configurations are also possible. In some embodiments, base2 divisible sizes are used to allow simplified logic and/or to allow the handle numbers to be contiguous and sequential.

By encoding only the handle's availability and keeping the database mapping at a coarser granularity, for example 4K blocks, storage requirements for handle allocation may be reduced and/or minimized. As also noted above, the handle memory word of FIG. 4 is 64 bits wide, and a handle block is 4K handles in size. Thus, determining which bit 172 refers to which numerical handle may be performed by decoding or indexing. For example, given a handle, the related availability bit may be found from the handle bits as follows: handle[5:0] determines the bit location of interest within a word, handle [11:6] determines the word within the handle block, and handle[n:12] determines which handle block to select. Thus, the handle itself may be used to address or index into the handle availability memory. It will also be understood that alternate handle encoding techniques may be performed, but they may be less straightforward than that described above.

Figure 5:
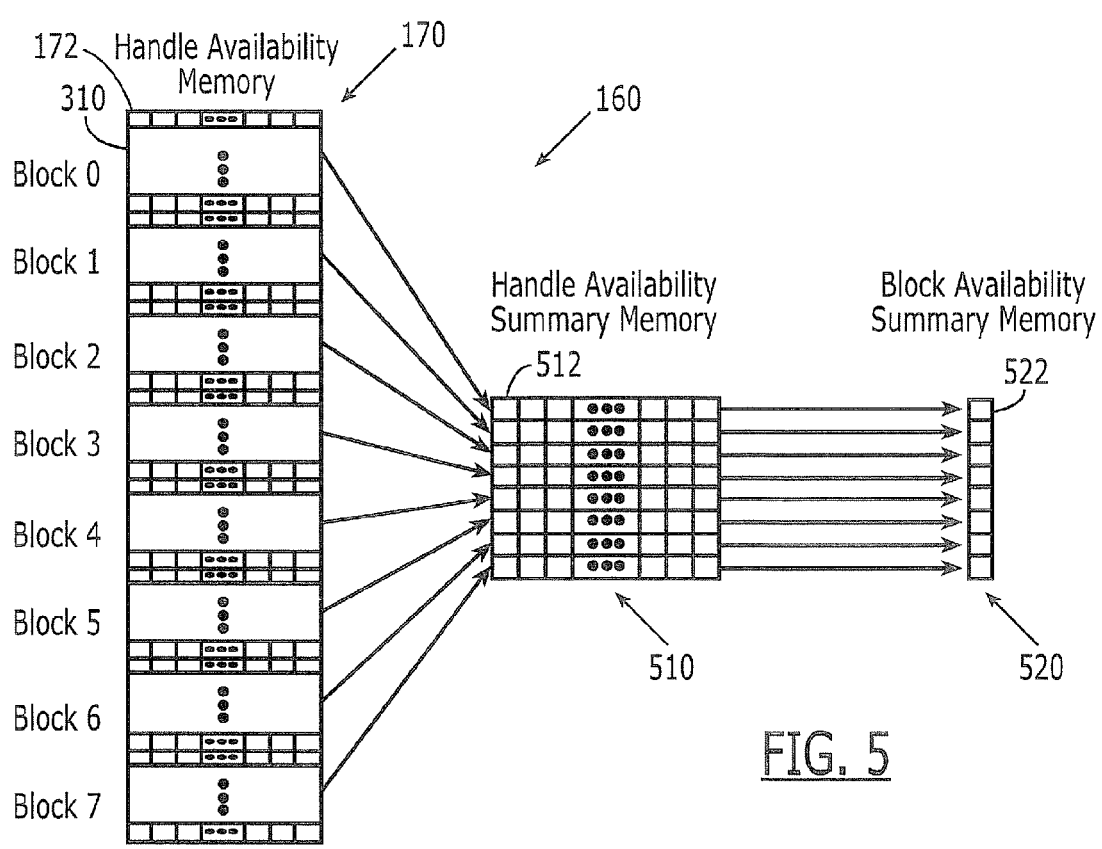
FIG. 5 illustrates a handle availability memory, a handle availability summary memory and a block availability summary memory, and their relationships, according to various embodiments of the present invention.

FIG. 5 is a block diagram of handle management memory structures according to other embodiments of the present invention. As was described above, a handle availability memory 170 can describe handle availability in a compact 1 bit per handle format. However, in order to aide next free handle searches, each word (e.g., line) of the handle availability memory 170 can be represented as a single bit 512 within a handle availability summary memory 510. Moreover, each word (e.g., line) of the handle availability summary memory 510 may be represented as a single bit 522 with a block availability summary memory 520, where each bit 522 represents whether a handle is available within the related handle block.

Thus, as shown in FIG. 5, the handle allocation manager 160 further comprises a handle availability summary memory 510 that is configured to store therein a plurality of handle memory group (e.g., word) availability indicators 512, a respective one of which provides an indication of whether a respective group (e.g., word) of handle memory locations contains at least one handle availability indicator 172. Moreover, in other embodiments of the invention, the handle allocation manager 160 further comprises a block availability summary memory 520 that is configured to store therein a plurality of handle memory block availability indicators 522, a respective one of which provides an indication of whether a respective plurality of groups of handle availability summary memory locations contain at least one handle memory group availability indicator 512. Embodiments of FIG. 5 thus illustrate 64:1 compression between the handle availability memory 170 and the handle availability summary memory 510, and another 64:1 compression between the handle availability summary memory 510 and the block availability summary memory 520. Other compression ratios may be used, and they need not be equal. Accordingly a next free/available handle may be found efficiently, as will be described below.

Figure 6:
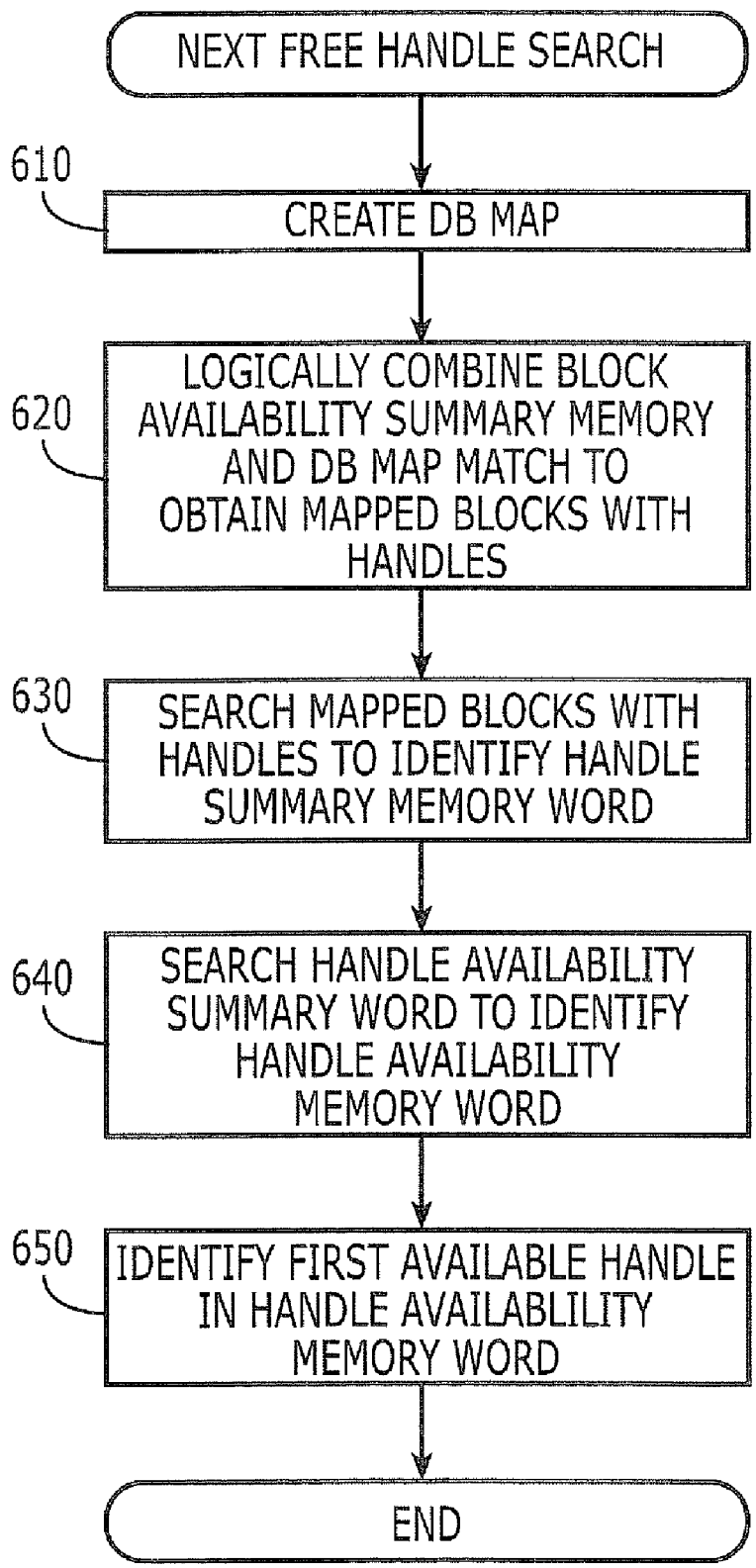
FIG. 6 is a flowchart of operations that may be used to perform a next free handle search according to various embodiments of the present invention.
Figure 7:
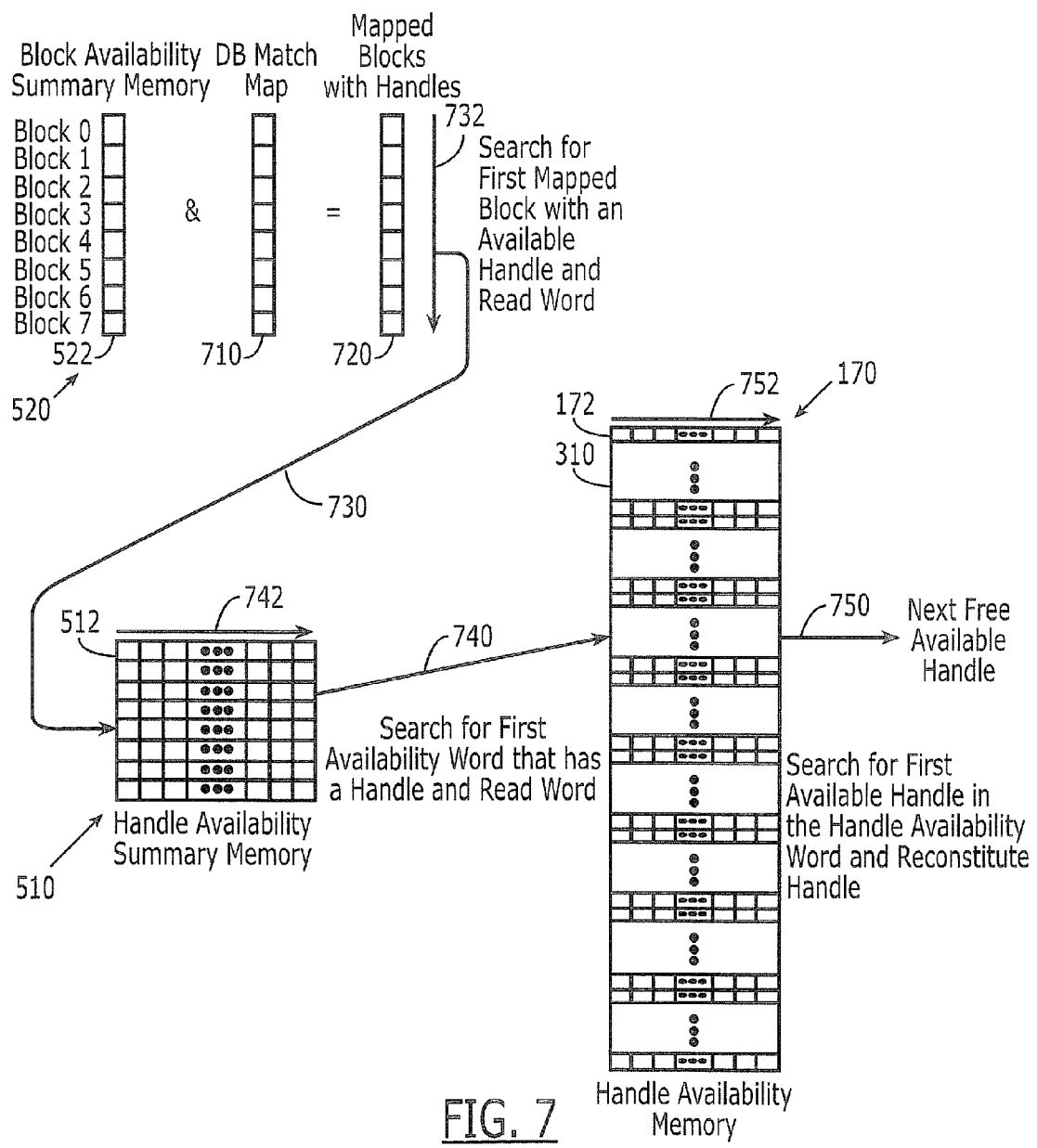
FIG. 7 is a functional block diagram illustrating operations that may be used to perform a next free handle search according to various embodiments of the present invention.

FIG. 6 is a flowchart, and FIG. 7 is a corresponding functional block diagram, of operations that may be performed to identify a next free available handle according to various embodiments of the present invention. If only a handle availability memory 170 is present, then the handle allocation manager 160 may be configured to search the handle availability memory to identify a next available handle. In other embodiments, if the handle availability memory 170 and the handle availability summary memory 510 are available, then the handle allocation manager 160 may be configured to search the handle availability memory 170 and the handle availability summary memory 510 to identify a next available handle. In still other embodiments, if the handle availability memory 170, the handle availability summary memory 510 and the block availability summary memory 520 are available, then all three memories may be searched to identify a next available handle. FIGS. 6 and 7 illustrate operations when all three memories are available. However, a subset of these operations may be performed according to other embodiments, when only two of the three or one of the three memories are available.

Referring now to FIGS. 6 and 7, operations begin by searching the block availability summary memory 520 in a given sequence, for example from least significant location to most significant location, to identify a first handle memory block availability indicator 522 and a corresponding handle availability memory block. More particularly, a database map 710 is created at Block 610, in the form of a bit map that indicates which handle blocks are assigned to the database to which the search pertains. Then, at Block 620, the block availability summary memory 520 and the database map 710 are logically combined, for example, logically ANDed, to create a new bitmap 720 that indicates which handle blocks are mapped to the database in question and also contain at least one available handle. This bitmap 720 may also be referred to as "mapped blocks with handles" 720. The newly created bitmap 720 is searched in a specific sequence, for example from least significant to most significant, as shown by arrow 732, to identify a handle availability summary memory word which should be searched at Block 630, as also shown by arrow 730. Arrow 732 identifies searching for a first mapped block with an available handle, and the arrow 730 causes the corresponding word line handle availability summary memory 520 to be read. It will be understood by those having skill in the art that any given sequence described herein may be from least significant to most significant, from most significant to least significant, and may be another sequence, such as a pseudorandom sequence.

Then, referring to Block 640, the identified word of the handle availability summary memory 510 is searched in a given sequence, as shown by arrow 742, to identify a first handle availability summary memory word that has a handle. The corresponding handle availability memory word is identified, as shown by arrow 740. Finally, as shown by Block 650 and arrow 752, the handle availability memory is read in a given sequence, for example from least significant to most significant, as shown by arrow 752, to search for the first available handle in the handle availability word. The handle availability memory word is processed to reconstitute the next free available handle, as shown by arrow 750.

Thus, embodiments of FIG. 7 search the block availability summary memory 520 in a given sequence 732, to identify a first handle memory block availability indicator 522 and a corresponding handle memory block 730, then search the word of the handle availability summary memory 510 corresponding to the handle memory block 730 in a given sequence 742, to identify a first handle memory group availability indicator 512 and a corresponding group of handle availability memory locations 740. Finally, the handle availability memory 170 is searched for the corresponding group of handle memory locations in a given sequence 752, to identify a first handle availability indicator 172 and a corresponding next available handle 750. As already noted, if the block availability summary memory 520 is not present, then the operations can begin with the searching the handle availability summary memory 510, and if the handle availability summary memory 510 is not present, operations can begin by searching the handle availability memory 170 itself.

Additional discussion of various embodiments of the present invention will now be provided. In particular, a high density, self-contained integrated circuit algorithmic search engine represents a new device type made possible by recent System-on-a-Chip advances. Embodiments of the invention can replace and/or supplement Content Addressable Memories (CAMs) at higher bit densities (e.g., 20/40/80 Mb and beyond). At a very high level, an algorithmic search engine can operate like a CAM in that keys are stored in a specific order and searches result in a predictable handle return. How these operations are performed within an algorithmic device is generally very different than within a traditional CAM. Embodiments of the invention are directed to how an algorithmic search engine performs handle allocation.

At a functional level, an algorithmic search engine that performs handle allocation should be able to perform some or all of the following functions:

1. map the handle space for a single or multiple databases;
2. inform the application of handles to use for database insertions via either:
   a. direct handle request (device performs next free handle search); or
   b. indirect handle request (application performs its own search);
3. verify that the handle to be inserted is both legal and available;
4. mark a handle as unavailable (due to either a key insertion or a handle request);
5. return (recycle) handles once they are no longer needed (due to key deletion); and/or 6. reclaim all resources consumed by a database in an expedient manner.

Each of these functions are described in detail below, according to various embodiments.

1. Mapping

Handles need not be mapped ahead of time, in strict sequential order or in accordance with the maximum expected size of a database. Instead, as databases grow they can be dynamically assigned additional handle resources as desired. In fact, the design can be configured to have more usable handles available than actual space to store keys due to the decoupling of handle management from physical key storage (i.e. not 1:1 mapped as in a CAM).

For implementation simplicity and/or efficiency reasons, handles can be assigned in predefined ranges, referred to herein as blocks. Blocks of handles can be mapped to a single database (FIG. 3A); mapped to a group of databases (where a group is fewer than the maximum number of databases) (FIG. 3B); mapped to all databases (common block) (FIG. 3C); and/or mapped to NO databases (i.e. handles are off limits, "not assigned") (FIGS. 3A-3C). Mapping handles in predefined blocks can allow each handle's availability to be represented in a very compact format (e.g., a single bit). By sizing blocks of handles so that they are base2 friendly, and mapping these blocks to databases, only the availability of a particular handle needs to be stored. By knowing the location within a memory word where the availability bit (indicator) resides, as well as the address of the word within the handle availability memory, the handle's value can be determined. See FIG. 4.

2a. Searching (for an Available Handle)

A next free handle (handle availability) search for a new handle (for insertion consumption) can be performed in numerous ways. Two embodiments are in order (sequence) search Least Significant (LS) handle up to Most Significant (MS) handle; and in order search MS handle down to LS handle. Using the above, a handle search operation, initiated by the application, requests an available handle for a specific database. The search returns the first numerical handle suitable for the database in question, unless no available handle is present, in which case a "no handle available" indication may be given. In some embodiments, the act of searching for an available handle need not mark the selected handle as unavailable. Marking a handle as "used" may be performed when a handle is checked for validity and availability during an attempted insertion into the search structure.

In other embodiments, a free handle search can mark the returned handle as used, so long as the application uses the handles it is assigned during an available handle search. Otherwise, a handle leak may result and may need to be fixed by performing a database flush or device reset.

As shown in FIG. 5, to aid block searching (and to keep diagnostic information) a handle availability summary memory 510 is kept in addition to the main handle availability memory 170. This summary memory 510 offers a more compact representation of a block's handle availability in order to allow accelerated searches. For example, in some embodiments, handle blocks are 4K handles large and use 64-64b words and a parallel summary memory 510 is ¹⁄₆₄th the size of the handle availability memory, with each 64b wide word representing a 4K block and each bit of the handle summary representing if an available handle existed in the related handle memory word of 64b.

An additional level of compression can be overlaid onto the handle availability summary memory 510 by keeping a scoreboard 520 to indicate if a block has at least 1 handle available (i.e., a block summary or summary of summary). This block availability summary memory structure 520 can be used during handle availability searches to efficiently exclude blocks that have no handle to offer.

FIG. 5 illustrates each of these three described data structures and how they are related. FIGS. 6 and 7 show how these data structures are used to perform a next free handle search.

Using the three memory structures described above, as well as the block mapping described earlier, a search for an available handle (next free handle) for a particular database can be accomplished by the following:

1. Compare the requesting database in question against block mapping to derive a block mask 710. This can reduce the search space from multi-database to a single database.

2. Overlay the block mask 710 with the block summary 520 to determine valid blocks to read 720.

3. Select (732) a valid block to read (handle availability summary memory word) via LS priority encoding, MS priority encoding, or an alternate technique.

4. Read 730 handle availability summary memory 510 word for the selected block.

5. Decode bits within the summary memory word in order 742 to select a handle availability word via LS priority encoding, MS priority encoding, or an alternate technique.

6. Read (740) the selected handle availability memory word.

7. Decode bits within the handle availability memory word 170 in order to re-construct a handle 750 via LS priority encoding, MS priority encoding, or an alternate technique.

By breaking up the search for the next available handle into multiple stages (as outlined above and illustrated in FIGS. 6 and 7) some embodiments may be implemented in a high-speed pipelined manner that can exhibit short latencies between successive searches. Moreover, some embodiments can support multiple databases by performing an initial comparison to determine which handle blocks are relevant for a free handle search being requested. If the design is pipelined, then multiple searches, for different databases, can be performed in parallel.

Multiple types of decoding can be used, but using a simple priority encoder to select between available blocks/handles can provide for a predictable, repeatable and testable design. By using a search routine that has a known output order, the handle mapping described above can be organized in such a way that single, group or common handle blocks are consumed in any desired order, i.e., exclusively mapped, group mapped and then common or vice-versa or some other combination.

2b. Reading

The application may only wish the search engine device to assist in the operation of handle allocation. This assistance may include the marking and unmarking of handles being available/unavailable (checks, returns and flushes), but not the determination of what handles should be used by which database. This mode of operation is supported by allowing the application to have read-only access to the handle availability data structures.

By periodically reading some (or all) of the data structure, the application can parse the handle availability information and select whichever handles it desires for a database, so long as the handle block mapping agrees with the selection. The application has the option of using the block summary 520 and/or handle availability summary 510 data structures to reduce the bandwidth it uses when fetching handle availability information.

3. Checking

If next free/available handle searches do not consume a handle by marking it as unavailable, then an operation should be available that does. This operation is a handle availability check. When a key/handle combination is inserted into an algorithmic search engine's database, a check should be made prior to processing the insert to determine if the database in question has handle management under the control of the device; the database and handle in question correlate to the handle block mapping; and the handle in question is available. This check may be performed with a fixed latency to limit the need for insertion command throttling or, alternately, instruction buffering.

If the database is configured such that the device is not responsible for managing its handles, then a check performed for the database can always result in a response that the handle is available for use. When this occurs, the device does not need to access any data structures.

If the database is configured such that the device is responsible for managing its handles, then a check should be made to see if the handle offered as part of the insertion request is legal. This may be performed by decoding the handle's value to determine its associated handle block and then comparing the block's mapping with the requesting database. An invalid comparison results in a response that the handle is unavailable for use. A valid comparison results in a memory read to determine handle availability, with the exact address being extracted from the handle. Once the handle availability memory word is read it is examined. The exact bit location of interest is determined by the handle's numerical value (usually the last n bits).

4. Marking

The response returned may depend on the value of the availability bit. If the handle is available, then it is marked as no longer available and written back. Marking a handle as unavailable may also need to update the summary and block summary structures, which can be read in parallel with the availability word.

5. Returning

After a key is deleted from a database within an algorithmic search engine, maintenance should be performed in order to return the previously used handle back to an available state. Returning a handle to an available state according to some embodiments can be much simpler than checking to see if it is available.

In particular, a determination may be made to see if the specified database is configured such that the device is responsible for managing its handles. If not, then no access is needed to return the handle back to the data structures. If yes, then all three data structures 170, 510 and 520 can be updated in parallel using some or all of the handle's value as an address/bit location guide. In particular, the handle availability memory 170 is read, modified and written back; the handle summary memory 510 is read, modified and written back; and the block summary structure 520 is modified. All modifications can indicate that a handle is available for use.

No cross-reference check need be performed between block mapping and the database, unlike during a check. Since the configuration was tested for correctness at the time of insertion and this configuration may have been modified, for instance for a database down sizing delete or other reason, no second test is needed.

6. Flushing

An algorithmic search engine can be designed in such a way that it can reclaim all resources consumed by a database without having to perform the tedious task by processing a long sequence of key deletions. When handle blocks are exclusively mapped (i.e. not group or common) then handle flushing can be implemented by the handle allocation manager without the need for additional information.

By walking through the handle blocks associated with the database being flushed and marking all handles as available via a simple write, not a read-modify-write, then a flush can be effectively performed. The flush is performed on the handle availability 170, the handle availability summary 510 and the block availability summary 520 data structures.

In conclusion, handle allocation management according to some embodiments of the present invention may be contrasted with handle allocation management in a CAM. In a CAM, the handle returned when a key search/lookup is performed happens to be the address of the memory location of the best/exact match. Although it may have its limitations, this property may be exploited to remove the requirement of having to physically store the handle associated with a key. In addition, a CAM can be made to search for vacant addresses in order to retrieve the next available "handle". Unfortunately, these techniques may not be reused in an algorithmic search engine.

In contrast to a CAM, an algorithmic search engine has no fixed relationship between a key's location within its search structure and the numeric value of the handle that a key search returns. Both the key and the handle generally must be stored to ensure that the proper handle is returned when a search is performed. Also, an algorithmic search engine may need an alternate techniques for assigning handles to databases in its search structure.

Current known algorithmic search engines do not appear to support handle management directly (outside entities perform this function); to support high search rates and low search latency; to support multiple databases; and/or allow some or all of the above simultaneously. In contrast, some embodiments of the invention can provide for mapping, flushing, tracking availability or, and/or checking availability of handles as well as searching for the next available handle in a high search rate, low search latency, multi-database algorithmic search engine design.

A handle allocation manager according to some embodiments of the invention can perform pipelineable high speed handle availability search data structures and algorithms that can scale to very large number (e.g., >1M) of handles, provide low latency available handle search results and/or fixed latency handle availability check. Some embodiments also allow for the decoupling of handle allocation from the main storage array.

Moreover, greater than 1:1 handles to key ratio, instead of a fixed relationship as in a CAM, can be provided. Thus, the number of handles available can be increased at little relative cost to the whole system, allocation can be made on more friendly base2 boundaries and/or additional flexibility may be provided to applications since these embodiments need not be locked into a limited range (e.g., may only desire 6K but must allocate 8K, but without the true loss of 2K handles).

Embodiments of the invention can also provide flexible handle mapping options for multiple databases: block(s) mapped to a single database; block(s) mapped to a group of databases; block(s) mapped every database; and/or blocks inaccessible (not allocated).

Sequential or non-sequential handle block assignment (agnostic) can be provided. Dynamic handle block to database assignment also can be provided that can dynamically add blocks mapped to a database and/or can dynamically remove blocks mapped to a database.

Moreover, next free handle availability search results need not use search array bandwidth, can have low fixed latency (pipelineable) and can be multi-database capable. Some embodiments may also provide raw data structure read capability for application controlled handle selection, which can provide device assists by continuing to update handle availability and/or reduced bandwidth requirement through use of summaries.

An efficient single bit handle availability indicator may also be provided in some embodiments, such that a handle's value indicates related availability. Handle validity and availability check on insertions (checks) may be provided with associated unavailable marking. Fixed latency check result may be provided to limit insertion command spacing and/or buffering. No handle validity check on deletions (returns) may be provided and an ability to reclaim all database consumed handles with a single operation request (flush) may be provided.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An integrated circuit search engine device, comprising:
   a plurality of serially connected stages, a respective one of which is configured to store therein a respective level of search keys in a multilevel tree of search keys, the plurality of serially connected stages including a first level stage that is responsive to an input search key and a last level stage that is configured to identify a best match key for the input search key;
   a handle memory including a plurality of handle memory locations, a respective one of which is configured to store a search result handle, the handle memory being responsive to the last level stage to retrieve a search result handle that corresponds to the best match key; and
   a handle allocation manager including a handle availability memory that is configured to store therein a plurality of handle availability indicators, a respective one of which provides an indication of whether a respective handle is available for association with a corresponding key.

2. A device according to claim 1 wherein the handle allocation manager further comprises a handle availability summary memory that is configured to store therein a plurality of handle memory group availability indicators, a respective one of which provides an indication of whether a respective group of handle memory locations contains at least one handle availability indicator.

3. A device according to claim 2 wherein the handle allocation manager further comprises a block availability summary memory that is configured to store therein a plurality of handle memory block availability indicators, a respective one of which provides an indication of whether a respective plurality of groups of handle availability summary memory locations contain at least one handle memory group availability indicator.

4. A device according to claim 3 wherein the handle allocation manager is further configured to search the handle availability memory, the handle availability summary memory and the block availability summary memory to identify a next available handle.

5. A device according to claim 4 wherein the handle allocation manager is further configured to search the handle availability memory, the handle availability summary memory and the block availability summary memory to identify a next available handle by searching the block availability summary memory in a given sequence to identify a first handle block availability indicator and a corresponding handle block, then searching the handle availability summary memory corresponding the handle block in a given sequence to identify a first handle group availability indicator and a corresponding group of handles, and then searching the handle availability memory for the corresponding group of handles in a given sequence to identify a first handle availability indicator and a corresponding next available handle.

6. A device according to claim 4 wherein the handle allocation manager is further configured to mark the next available handle as not available in response to associating the next available handle with a key, to mark the handle memory summary location that includes the next available handle as not available if no more available handles are present in the corresponding handle group and to mark the block availability summary memory location that includes the handle memory summary location as not available if no more available handles are present in the corresponding block.

7. A device according to claim 3 wherein the handle allocation manager is further configured to mark a given available handle as not available in response to associating the given available handle with a key, to mark the handle memory summary location that includes the given available handle as not available if no more available handles are present in the corresponding handle group and to mark the block availability summary memory that includes the given handle memory summary location as not available if no more available handles are present in the corresponding block.

8. A device according to claim 2 wherein the handle allocation manager is further configured to search the handle availability memory and the handle availability summary memory to identify a next available handle.

9. A device according to claim 8 wherein the handle allocation manager is further configured to search the handle availability memory and the handle availability summary memory to identify a next available handle by searching the handle availability summary memory in a given sequence to identify a first handle memory group availability indicator and a corresponding group of handles, and then searching the handle availability memory for the corresponding group of handles in a given sequence to identify a first handle availability indicator and a corresponding next available handle.

10. A device according to claim 8 wherein the handle allocation manager is further configured to mark the next available handle as not available in response to associating the next available handle with a key, and to mark the handle memory summary location that includes the next available handle as not available if no more available handles are present in the corresponding handle group.

11. A device according to claim 2 wherein the handle allocation manager is further configured to mark a given available handle as not available in response to associating the given available handle with a key, and to mark the handle memory summary location that includes the given available handle as not available if no more available handle memory locations are present in the corresponding handle group.

12. A device according to claim 1 wherein the handle allocation manager is further configured to search the handle availability memory to identify a next available handle.

13. A device according to claim 12 wherein the handle allocation manager is further configured to mark the next available handle as not available in response to associating the next available handle with a key.

14. A device according to claim 12 wherein the handle allocation manager is further configured to search the handle availability memory to identify a next available handle by indexing into the handle availability memory using the search result handle that is retrieved.

15. A device according to claim 1 wherein the handle allocation manager is configured to mark a given available handle as not available in response to associating the given available handle with a key.

16. A device according to claim 1:
   wherein each of the serially connected stages is configured to store therein a respective level of search keys in a plurality of multilevel trees of search keys for a plurality of databases;
   wherein the handle memory is configured to store search result handles for the plurality of databases; and
   wherein the handle allocation memory is configured to store therein a plurality of handle availability indicators for the plurality of handles for the plurality of databases.

17. A device according to claim 16 wherein the handle availability memory includes at least one group block that is configured to store therein handle availability indicators for at least two of the databases.

18. A device according to claim 17 wherein the handle availability memory includes at least one common block that is configured to store therein handle availability indicators for all of the databases.

19. A device according to claim 18 wherein the handle availability memory includes at least one exclusive block that is configured to store therein handle availability indicators for a predetermined one of the databases.

* * * * *